UNITED STATES PATENT OFFICE.

ADOLF KAYSER, OF BUFFALO, NEW YORK, ASSIGNOR OF ONE-HALF TO ALBERT B. YOUNG, OF SAME PLACE.

MANUFACTURE OF GLUCOSE OR GRAPE-SUGAR.

SPECIFICATION forming part of Letters Patent No. 304,103, dated August 26, 1884.

Application filed February 1, 1884. (No specimens.)

*To all whom it may concern:*

Be it known that I, ADOLF KAYSER, of the city of Buffalo, county of Erie, and State of New York, have invented a new and useful Improvement in the Manufacture of Glucose or Grape-Sugar, of which the following is a specification.

This invention relates to an improvement in the manufacture of glucose or grape-sugar from the whole grain.

Many attempts have heretofore been made to produce glucose or grape-sugar directly from the ground grain without first extracting the starch therefrom and then converting the starch; but all of these attempts have been unsuccessful, for the reason that the product was of inferior quality, both as to color and taste, chiefly owing to the presence in the glucose or grape-sugar, of salts of iron and alumina, and of gluten and other nitrogenous substances.

The object of this invention is to thoroughly eliminate these impurities from the product, thereby producing directly from the meal of grain glucose or grape-sugar having a permanent white color and a sweet, pleasant taste.

My invention consists, to that end, of the improvements in the process of manufacturing glucose or grape-sugar, which will be hereinafter fully explained.

In practicing my improved process I grind the grain to meal, or otherwise reduce the grain in any suitable or well-known manner, and convert the ground or reduced grain into glucose in any suitable manner by the action of a suitable acid. I then neutralize the converted material by adding thereto a soluble sulphuret of an alkaline earth metal, such as calcium or barium. This neutralization is continued until the reaction of the material is perfectly neutral, or, better, slightly alkaline. After the neutralizing agent has been thoroughly mixed with the converted material, the warm mass is permitted to come to a state of rest and allowed to remain so for an hour or more, or until all the sulphuret of iron, hydrated oxide of alumina, and albuminous matter have been separated. During this process sulphate of lime, sulphurated hydrogen, and sulphuret of ammonium are liberated. The insoluble residue is now separated from the saccharine liquor, and atmospheric air is passed through the liquor until the escaping air is perfectly free from any traces of sulphur. This process frees the liquor from the sulphurated hydrogen and sulphuret of ammonia contained therein, partly by mechanical action and partly by the oxidizing action of the oxygen contained in the air. This process can be expedited by heating the liquor. The purified liquor is then concentrated, bleached, filtered, or finished in any suitable or well-known manner.

Of all combinations of calcium and sulphur, including the oxysulphuret, the monosulphuret of calcium ($Ca S$) is the most effective and at the same time the cheapest, because it can be easily made from the refuse sulphate of lime by subjecting the latter to a red heat in a retort in the presence of a reducing agent, such as carbon or oxide of carbon or hydrogen, or a combination of them. The corresponding salts of barium act in a similar manner, but are more expensive and less effective in producing a good color. The sulphurets of the alkali metals could be used for the neutralization, but the sulphates thereof would remain in the liquor as impurities, which is undesirable. The neutralization may be accomplished by first using carbonate of lime (marble-dust, &c.) to neutralize the greater portion of the acid, and then using sulphuret of calcium to finish the neutralization. The carbonate of lime is not capable of penetrating the ground grain, and therefore can only be used for partially neutralizing the material. The sulphuret is soluble and penetrates the whole mass, and thus comes in contact with every particle of the acid, thereby effecting a complete neutralization of the same.

I claim as my invention—

1. The herein-described improvement in the art of manufacturing glucose or grape-sugar from grain, which consists in neutralizing the acidulated converted material by sulphuret of calcium or its equivalent, substantially as described.

2. The herein-described improvement in the art of manufacturing glucose or grape-sugar from grain, which consists in neutralizing the acidulated converted material by a soluble sulphuret, substantially as described.

3. The herein-described improvement in the art of manufacturing glucose or grape-sugar from grain, which consists in purifying the neutralized liquid by passing an air-current through the same, substantially as described.

4. The herein-described improvement in the art of manufacturing glucose or grape-sugar from grain, which consists in neutralizing the material by a soluble sulphuret, and then purifying the neutralized liquid by passing an air-current through the same, substantially as described.

In testimony whereof I have hereunto set my hand this 30th day of January, 1884.

A. KAYSER.

Witnesses:
 EDWARD WILHELM,
 F. L. BROWNE.